(12) United States Patent
Dasgupta et al.

(10) Patent No.: US 7,882,092 B2
(45) Date of Patent: Feb. 1, 2011

(54) METHOD AND SYSTEM FOR HOARDING CONTENT ON MOBILE CLIENTS

(75) Inventors: Gargi B. Dasgupta, New Delhi (IN); Tapan Kumar Nayak, New Delhi (IN); Balaji Viswanathan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 12/061,716

(22) Filed: Apr. 3, 2008

(65) Prior Publication Data

US 2009/0100127 A1    Apr. 16, 2009

Related U.S. Application Data

(63) Continuation of application No. 11/567,936, filed on Dec. 7, 2006, now abandoned.

(51) Int. Cl.
*G06F 7/00* (2006.01)
*G06F 17/30* (2006.01)

(52) U.S. Cl. .............. 707/705; 370/395.21; 370/394.43
(58) Field of Classification Search .......... 707/705, 707/758, 609, 661
See application file for complete search history.

(56) References Cited

U.S. PATENT DOCUMENTS

| | | | |
|---|---|---|---|
| 6,075,770 A * | 6/2000 | Chang et al. ........... 370/395.21 |
| 6,182,133 B1 * | 1/2001 | Horvitz ..................... 709/223 |
| 6,959,436 B2 | 10/2005 | Peng | |
| 7,127,560 B2 * | 10/2006 | Cohen et al. ................ 711/141 |
| 7,636,132 B2 * | 12/2009 | Sakamoto .................. 348/723 |
| 2002/0049723 A1 * | 4/2002 | Kurihara et al. .............. 707/1 |
| 2003/0187984 A1 * | 10/2003 | Banavar et al. ............ 709/225 |
| 2005/0080994 A1 | 4/2005 | Cohen et al. | |
| 2005/0094609 A1 * | 5/2005 | Tandai et al. ................ 370/338 |
| 2006/0004923 A1 | 1/2006 | Cohen et al. | |
| 2009/0172773 A1 * | 7/2009 | Moore ......................... 726/1 |
| 2009/0213722 A1 * | 8/2009 | Backes et al. .............. 370/201 |

OTHER PUBLICATIONS

Sharifi, Golha (University of Saskatchewan, Computer Science Department); Vassileva, Julita; Deters, Ralph "Seamless communication and access to information for mobile users in a wireless environment" ICEIS 2004—Proceedings of the Sixth International Conference on Enterprise Information Systems, 2004, p. 122-129.

(Continued)

*Primary Examiner*—John R. Cottingham
*Assistant Examiner*—Susan F Rayyan
(74) *Attorney, Agent, or Firm*—Gibb I.P. Law Firm, LLC; Derek S. Jennings

(57) ABSTRACT

A device and method for efficient hoarding content set on a mobile client prior to disconnection of the mobile client from a network. The content set to be hoarded on the mobile client and a respective schedule for hoarding the content set on the mobile client are dynamically computed by considering various real times factors such as file utilities, device capabilities and network connectivity that affect the performance of the mobile client and the hoarding process.

20 Claims, 5 Drawing Sheets

201

OTHER PUBLICATIONS

Shen, H. (Dept. of Comput. Sci. & Eng., Texas Univ., Arlington, TX, USA); Mohan Kumar; Das, S.K.; Wang, Z. "Energy-efficient caching and prefetching with data consistency in mobile distributed systems" *Proceedings. 18th International Parallel and Distributed Processing Symposium*, 2004, p. 67.

Badrinath, B.R. (Dept. of Comput. Sci., Rutgers Univ., New Brunswick, NJ, USA); Phatak, S.H "On clustering in database servers for supporting mobile clients". *Cluster Computing*, v 1, n 2, 1998, p. 149-59.

Drew, S. (Dept. of Electr. & Comput. Eng., Toronto Univ., Ont., Canada); Liang, B. "Mobility-aware Web prefetching over heterogeneous wireless networks" 2004 IEEE 15th International Symposium on Personal, Indoor and Mobile Radio Communications (IEEE Cat. No. 04TH8754), 2004, pt. 1, p. 687-91 vol. 1.

Shun-Zheng Yu (IBM Res. Div., IBM Thomas J. Watson Res. Center, Yorktown Heights, NY, USA); Mark, B.L.; Kobayashi, H. "Dynamic Web pages for location-based services"Proceedings of the IASTED International Conference on Wireless and Optical Communications, 2002, p. 457-63.

De Nitto Persone, V. (Dipt. di Inf. Sistemi e Produzione, Tor Vergata Univ., Rome, Italy); Grassi, V.; Morlupi, A "Modeling and evaluation of prefetching policies for context-aware information services" MobiCom'98. Proceedings of Fourth Annual ACM/IEEE International Conference on Mobile Computing and Networking, 1998, p. 55-65.

Loon, T.S. (Dept. of Electr. & Comput. Eng., Illinois Univ., Urbana, IL, USA); Bharghavan, V. "Alleviating the latency and bandwidth problems in WWW browsing" Proceeding of the USENIX Symposium on Internet Technologies and Systems, 1997, p. 213-30.

Carl Tait; Hui Lei; Swarup Acharya; Henry Chang: "Intelligent File Hoarding for Mobile Computers"ACM Conference on Mobile Computing and Networking (Mobicom '95), Berkeley, CA, Nov. 1995.

Trifonova, Anna and Ronchetti, Marco (2004) "Hoarding Content in M-Learning Context" Technical Report, Informatica e Telecomunicazioni, University of Trento.

Dasgupta, et al., U.S. Appl. No. 11/567,936, Office Action Communication, Aug. 18, 2009, 12 pages.

* cited by examiner

300

METHOD AND SYSTEM FOR HOARDING CONTENT ON MOBILE CLIENTS

CROSS-REFERENCE TO RELATED APPLICATIONS

This application is a continuation of U.S. application Ser. No. 11/567,936 filed Dec. 7, 2006, the complete disclosure of which, in its entirety, is herein incorporated by reference.

FIELD OF THE INVENTION

This invention relates to a method of hoarding content on a mobile client and an intelligent mobile information processing system.

BACKGROUND OF THE INVENTION

With the increasing prevalence and popularity of mobile computing, users are increasingly demanding for constant and continuous availability of content thereby making mobile computing a dominant force in personal computing. With advances in mobile technology, a plethora of portable electronic devices (mobile clients) such as laptops computers, handheld devices and the like, promise to deliver the vision of accessing user data anytime, anywhere. However, in the absence of a continuous wireless connectivity, it becomes imperative to provide support for disconnected operations in mobile environments. Wireless links are slow, sometimes unreliable, expensive to implement and use and are not available to all users.

Hoarding (caching) is a technique that allows users, for example mobile users, to locally cache content on a mobile client and then accesses the cached content even while the mobile client is operational in a disconnected mode. Hoarding is used for selecting content set, for example a set of documents or files or any other specific form of data, and caching the content set on a mobile client. The cached content set may be used when mobile client is disconnected for example from the network. This allows anytime, anywhere access to data on a mobile client and is advantageous in supporting off line access to content. To ensure that the client can continue to access all the necessary files, the hoarding scheme may cache some files that the client never uses during that particular period when the client is disconnected. This leads to loading the client with information and files that are unnecessary and hence leads to consumption of disk space and resources, which are limited on a mobile client.

Often constraints, such as the device memory and the like on the mobile client are not sufficiently large to accommodate the content set that has been requested and hence a decision needs to be made on the content set that is required to be hosted on the mobile client. A normal hoarding process requires the mobile client to be synchronized with a main system, for example a server, from where the content set is being fetched. Hoarding and user behavior analyzing engines are placed typically on the server side in order to analyze the tracking data; to create user models and to decide on what materials should be included in the content set. Existing solutions to this problem rely on solutions that are a combination of hoard profiles and spying on a users file access. Neither of these approaches is ideal in terms of user friendliness and reliability. In fact one of the problems with mobile clients is that they are primarily disconnected entities that connect to and disconnect from the servers at the clients' discretion.

Assuming the existence of an anytime, anywhere, on-demand wireless communication service, a cache miss while disconnected is an expensive proposition due to the cost and re-establishing communications with the servers. The goal of hoarding (caching) is to eliminate cache misses entirely during periods when the mobile client is disconnected. For example, consider a user who travels. Prior to disconnection the user runs the applications intended for use while traveling thereby filling the local disk cache appropriately. A disadvantage with this is, in addition to being inconvenient; a program may require different files for different types of executions. No single execution reveals the full gamut of an application's file access. In another case, the user may specify precisely the files and directories to be hoarded in a hoard profile. This approach is more cumbersome and unreliable. An additional disadvantage of this approach is that creating an accurate hoard profile is not trivial. For example, even a conscientious user might not be able to accurately specify all of the files needed by a specific program. A further disadvantage is that when a mobile user is disconnected a cache miss could mean a significant loss in time, money and a complete halt to work if critical information has not been cached.

These disadvantages are magnified if critical cache misses occur during disconnected operations. The penalty of such cache misses is very high and may prevent a disconnected client from continuing its operation altogether. A further disadvantage is that the hoarding systems do not work well for personal information appliances that provide access to information that cannot be neatly organized and that do not have a recurring access pattern. A further disadvantage is that mobile computing devices have constraints such as battery power, signal strength, network bandwidth etc., which are not taken into consideration in present hoarding systems.

Without a way to improve the method and system of hoarding, the promise of this technology may never be fully achieved.

SUMMARY OF THE INVENTION

A first aspect of the invention is a method for hoarding, on a requesting entity. The client is configured to compute a hoard set, and a respective schedule for hoarding the hoard set on the client. At the schedule time, the client is configured to initiate the hoarding process by communicating with a respective servicing entity. The hoarding process typically involves a client communicating with a server to fetch the desired content set and then cache the content set onto the client. The process of hoarding is preferably executed prior to disconnection of the client and/or the server from the network. An advantage is that the client is configured to compute available power, bandwidth and other dependent factors thereby enhancing the performance of the client for hoarding the content set. Factors such as available power and bandwidth resources are considered while computing the content set and the schedule thereby allowing the client to efficiently manage the power consumption and network bandwidth during the hoarding process.

A second aspect of the invention comprises an electronic computing device comprising at least a processor unit, a memory unit, an input output interface and a transceiver. The electronic computing device is configured to compute the content set to be hoarded and the respective schedule for hoarding the content set. At the scheduled time for hoarding, the required content set is transmitted as a signal embodied in a carrier wave from a server to the electronic computing device. The client is further configured to receive the signal which contains the content set and then cache the content set on the electronic computing device prior to disconnection.

The electronic computing device comprising at least the processor unit and the memory unit further contains a computer program product which on being loaded is capable of providing the processing unit with the capability of execute the hoarding method.

DETAILED DESCRIPTION

Overview

Figure 1:
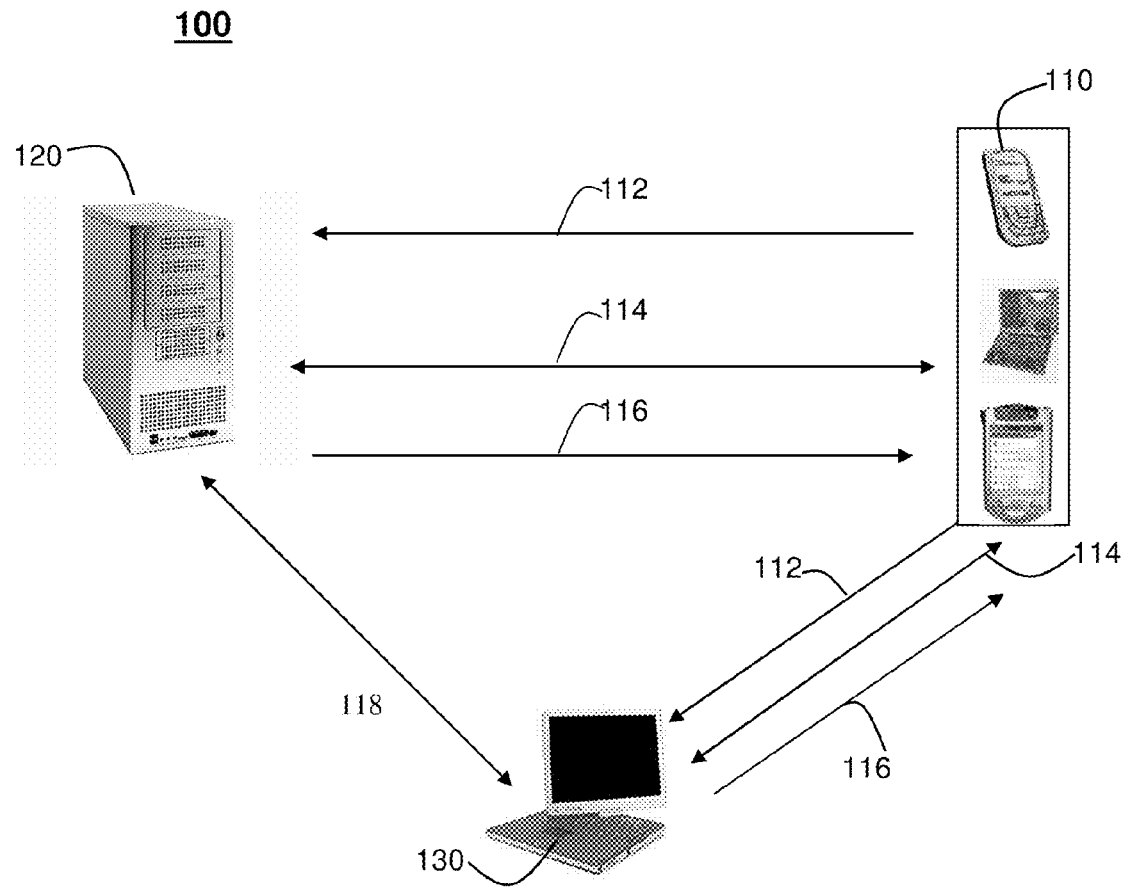
FIG. 1 illustrates an embodiment of typical system architecture in accordance with the invention.

Where reference is made in any one or more of the accompanying drawings to steps and/or features, which have the same reference numerals, those steps and/or features have for the purposes of this description the same function(s) or operation(s), unless the contrary intention appears. The expression "requesting entity" should be understood as a client, such as a mobile client. The expression "servicing entity" should be understood as a server on which content may be hosted. The expression "hoarding" is to be understood as synonymous with "caching". The expression "hoard set" is to be understood as a "content set" or "content" or "file set" or "set of files" or "files". The expression "intermediate communication medium" is to be understood as a "gateway". Other equivalent expressions to the above expression would be apparent to a person skilled in the art.

Disclosed is a system and method of efficient hoarding content on mobile clients particularly during disconnected operations in a mobile environment. Hoarding allows mobile users to locally cache content while a mobile clients, for example portable electronic device such as a mobile phone, a personal digital assistant, a pocket personal computer and the like, immediately prior to disconnection or in a weakly connected mode. In this application, whenever the phrase "immediately prior to disconnection" is used it refers to the mobile client being in a disconnected mode and/or in a weakly connected mode. The content set cached can then be accessed by the client in the disconnected mode. To cache content efficiently it is necessary to compute a content set and a proper schedule for hoarding the hoard set on the client that is requesting the hoarding.

To compute the schedule for hoarding content on the mobile content, typically factors/attributes such as file utilities, device capabilities, network connectivity and the like are considered. The hoarding process selects a content set based on the content/file utilities and then, depending on the other factors, a schedule for hoarding the content set is computed by the client. In one embodiment, the content set and the schedule can also be computed on a gateway based on the request of the client.

At the scheduled time for hoarding, the client is configured to receive the content set from the server and/or the gateway. The client then caches the content set on the local memory or storage space available in the client such that the content set is available when the client is in a disconnected mode.

System

FIG. 1 depicts an exemplary embodiment of system architecture 100 involving a client 110 and a server 120. The client 110 is configured to fetch content from a server 120. The content fetched from the server is then cached locally on the client 110, for example on a memory device of the client. According to the framework, the system 100 is also geared towards storage limited clients, for example thin clients and semi-thin clients. Clients 110 preferably include and are not limited a variety of portable electronic devices such as mobile phones, personal digital assistants (PDAs), pocket personal computers, laptop computers and the like. It should be apparent to a person skilled in the art that any electronic devices which include at least a processor and a memory can be termed as a client within the scope of the present invention.

The client 110 is configured to compute the content set which is required to be cached, for example the content set contains a set of files. In addition to computing the content set, the client 110 is also configured to compute a schedule for hoarding the content set by considering factors such as network connectivity, device characteristics, file characteristics and the like. Factors that typically affect the performance of the client 110 are also considered in computing the content set and the schedule for hoarding the content set. Once the content set and the schedule for hoarding the content set has been computed, the client stores the content set and the schedule, for example as a calendar entry, and at the schedule time, the client 110 is configured to trigger and initiate the hoarding process. The client fetches the content set from the respective server, and then caches the content set onto the client prior to disconnection. The content set may be computed by the client either manually or without any manual intervention.

In one embodiment, the client 110 is configured to dynamically determine the content set and the schedule for hoarding the content set. For example, if during the process of fetching the content set from the server and caching the content set locally on the client 110, the available battery power of the client 110 is insufficient to complete the process of fetching and caching, the client 110 is configured to immediately disconnect from the hoarding process. The client 110 is then configured to determine entities (for example, a set of files) that have been fetched and cached and compute a new schedule for hoarding the remaining entities of the original content set. In one embodiment, the client 110 may be configured to discard the content set that was fetched and compute a new schedule for fetching and caching the original content set when partially cached content is found on the client. In a further embodiment the client may be configured to store a list of proximate servers from which the content set is fetched at a quickly and reliably.

The content set required by the client 110 is computed or generated by the client 110, with or without any human intervention. The content set typically contains a set of files or programs or any other specific content that is required by the client 110 for use by the client in an offline mode. When the content set has been determined, the client 110 computes a schedule for hoarding the content set on the client. At the schedule time, the client is configured to transmit a request 112, for example the request containing the content set and any other relevant information, to a respective server 120. The server 120 is configured to transmit a response 116 to the request 112, the response 116 is received by the client 110.

For example, the response 116 contains a set of files that were requested with any other relevant information. Typically, communication between the client 110 and the server 120 requires a client-server protocol 114, for example TCP/IP, push-pull mechanisms or the like, which is established once the client 110 sends a request to the server 120 and the server acknowledges the request from the client.

Typically, servers 120 are available in many forms such as application servers, web servers, database servers, and so forth. Preferably, the gateway 130 and the server 120 may be coupled into a single system that is configured to perform the role of the server 120 and functions as a gateway 130. In addition, an external storage device capable of storing content may be coupled to the server and/or the intermediate communication medium and can be termed as a server within the scope of this invention.

In a further embodiment, the client 110 is configured to send a request to the server 120 requesting a content set to be cached on the client. The server 120 based on the parameters/factors described above is configured to compute a schedule for hoarding the content set, and at the scheduled time initiating transferring the content set to the cached on the client 110 using a push mechanism. In this case, the server 120 needs to constantly ping the client 110 to get information on the current status of the client 110 and then predict an accurate schedule for hoarding the content set on the client 110 by considering the variations involved the various client factors. This can typically be computed using a historical database of the previously stored status factors related to the client and use the current status factor to interpolate with the historically available data to predict and compute an accurate schedule.

In a further embodiment, certain clients 110 require a gateway 130 to communicate with the server 120. The essential feature of gateway 130 is to translate the request 112 from the client 110 in a format that the server 120 is capable of understanding. The request 112 from the client 110 is first transmitted to a gateway 130. The gateway now performs the role of the client by requesting the server 120 for the content set. The gateway 130 is then configured to receive the content set and locally cache the content set on the local cache of the gateway 130. The communication between the gateway 130 and the server 120 is typically via the communication channel 118, TCP/IP, push-pull or the like as described previously. At the scheduled time for hoarding the content on the client 110, the gateway is configured to transmit the content set to the client as a response 116 using for example a push mechanism and the content set pushed from the gateway 130 is cached on the client 110.

In a further embodiment, the client 110 may transmit the request 112 containing the hoarding schedule and/or the content set in advance to the gateway 130. The request 114 from the client 110 is transmitted to the gateway 130 in advance. The gateway processes the request 114 of the client 110 and is configured to pre-fetch the content set from the server 120, even prior to the schedule time for hoarding and the fetched content set from the server is cached on the gateway 130. At the scheduled time for hoarding the content set on the client 110, the gateway 130 is configured to push the content set to the client 110. The client 110 is configured to receive the content set and subsequently cache the content set prior to disconnection from the network. An advantage of using the gateway is that the content set may be pre-fetched and stored on the server and/or gateway, thereby pushing the content set from the gateway to the client making the connection faster by pre-processing of the request 114 and formatting content set received from the server 120 in a way that is required by the client 110. In yet a further embodiment, as described earlier in the case of the server, the gateway 130 may compute the scheduled time of hoarding the content on the client 110 by determining the current status of the client 110 and using a historical database of previously stored factors for the client. The pre-fetching from the server may also be advantageously performed by scheduling the content fetching from the server to the gateway by considering current status of the server and previously stored values in a historical database. An advantage of this method is better predictability and efficient content fetching and caching.

A further advantage of using the gateway 130 is because of the limited memory on the client 110 large amount of content/files cannot be stored on the client 110. Therefore, the content set is fetched as requested by the client 110 from the local cache of the gateway 130. Content is accessed by the client 110 via a network from the server 120 and/or the gateway 130 when in a connect mode or in a weakly connect mode. A further advantage is the efficient performance of hoarding the content set over a slow and unreliable network connection. This is, because the schedule computed considers various parameters for the client 110 such as the battery power, the energy consumption required for hoarding the files onto the local cache, the received and transmitted signal strength, the signal strength of the network, network bandwidth availability, and the like. Hoarding the content set on the client 110 is preferably done dynamically without any human intervention or can be also done by manual intervention.

The client 110 is coupled to the server 120 either directly or via gateway 130 by means of a wired network, a wireless network or a combination thereof. For example a wired network includes coupling via cable, optical fiber and the like. Wireless networks include wireless standard such as Bluetooth, digitally enhanced cordless telecommunication (DECT), dedicated short range communication (DSRC), HIPERLAN, HIPERMAN, IEEE 802.11x, IrDA, Radio frequency Identification (RFID), WiFi, WiMax, xMax, ZigBee and the like.

For example, it is advantageous for the client 110 to cache the required content/files only when the desired level of network connectivity is favorable. The content/files are prioritized, by grouping the files or ordering the files, and based on the various parameters such as battery power, network bandwidth, signal strength etc, which are real-time characteristics of the client and/or the connectivity, and a schedule for hoarding the content/files is computed either at the client 110 and/or the server and/or the gateway 130 as described previously and the required content set is fetched from a respective server and cached on the client 110 efficiently.

Workflow

Figure 2A:
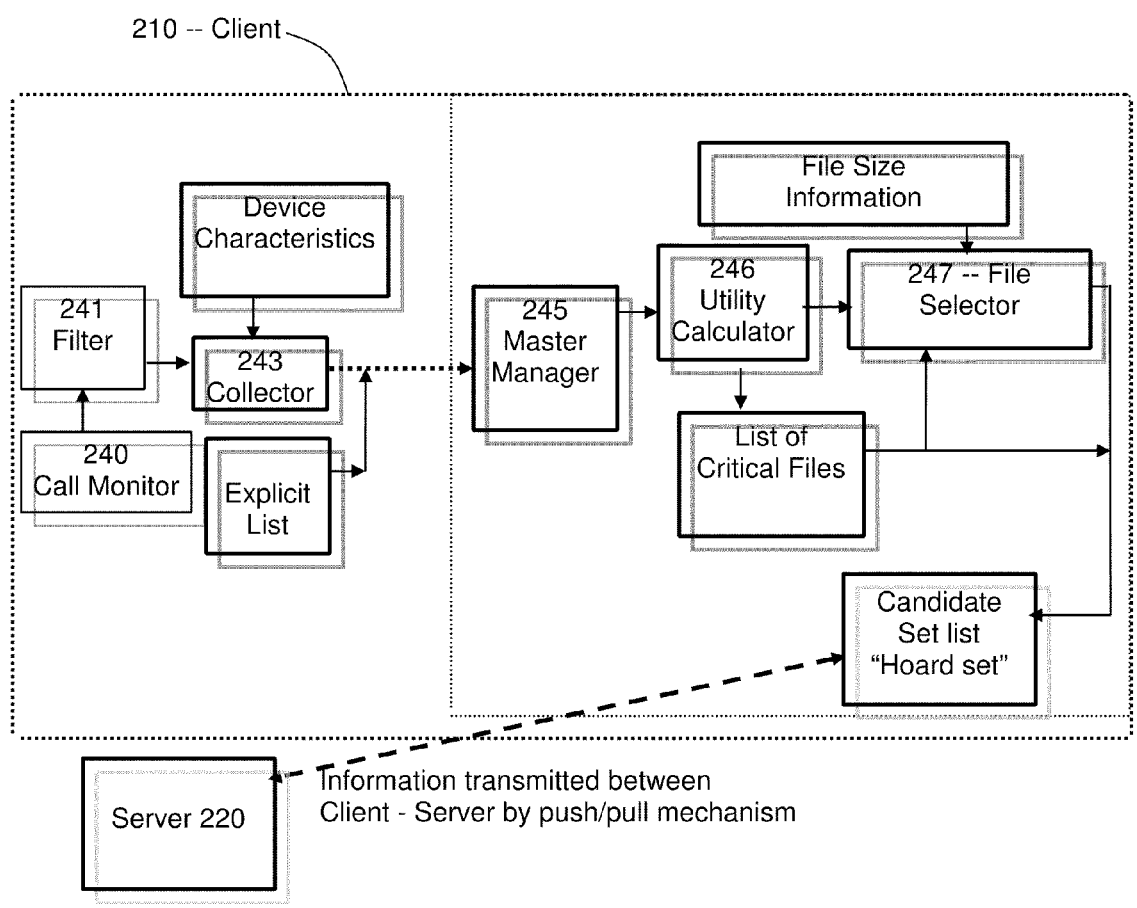
FIG. 2A illustrates an exemplary embodiment of hoarding workflow for a receiving entity and a servicing entity.

FIG. 2A illustrates an exemplary embodiment of a typical workflow 200 for hoarding the content set on the client 210. The client 210 is typically coupled to a respective server 230 on which the content set is available and the client-server connection 114 allows seamless access to the content set for clients 210 over a network.

The main components of the client 210 comprise a call monitor 240 which is configured to monitor the file system calls made by client 210 (and all its applications) such as open, close, read, write etc. For example, in a Linux client call monitoring can be done at the virtual file system (VFS) layer by trapping. For other operating systems, the call monitor 240 is configured to hook into the file system that is used to trap these calls. The call monitor 240 collects the information about file references such as file names, time of reference, process name etc., and these references are passed to on to a filter 241 that is coupled to the call monitor 240.

Some processes such as the UNIX find (stat) access a number of files for a short period of time. These processes can cause confusion in calculating the hoarding schedule for the content set and affect the prediction of computing the hoarding schedule adversely. In order to nullify the effects of such unwanted processes in the computation of the hoarding schedule, the filter 241 is configured to discard such accesses to these processes. The information that remains on the valid file access is saved into the collector 243 which is coupled to the filter 241.

The collector 243 stores information about all valid file accesses for the client. The collector 243 is shared between call monitor 240, for example the kernel entity, and the master manager 245, for example the user entity which is configured to address information exchange efficient. An explicit list is created on the client 210 to provide the user a means to specify a list of files/list of content, i.e., the content set, which should be hoarded irrespective of their utility values. This option avoids any inconvenience of missing important but less frequently used content/files. Preferably, the content/files that were missed during the disconnected operation are stored in the client 210 to improve its accuracy during any future use. For example, the user records the miss along with an indicator specifying whether the particular miss was a show-stopper, hard-miss or ignorable soft-miss. The list of content/files from the content set that are missed is updated with the client 210 for computing a suitable hoarding schedule.

The master manager 245 maintains a master table, for example a lookup table, where information about the file access is stored. Information from the collector 240 is used to update the corresponding file access history in the master table. A utility calculator 246 is coupled to the master manager 245, which is configured to read the file access history and the previously stored utility values in the master table. The utility calculator 246 is configured to compute the utility value for each file at the scheduled hoarding time using the already stored utility values and file access history. The utility calculation is an adaptive process and it gains accuracy over a period of time as the master table is updated during every hoarding process. In a further embodiment, the system is configured to learn the important content/files in a content set being cached and to dynamically compute a hoarding schedule for such content/files.

For example, a list of critical files are those that are essential for system operation and may contain important control and configuration information, for example "dot" files that record the start up and configuration information of UNIX-specific applications. These files tend to be small and consume relatively low disk space, for example 1.5 MB for office/, 52 KB for .fvwm/, etc. The master table in the master manager 245 determines which content/files of the content set are critical for a client 210. For example, in thin clients that have a small hoard capacity, the dot files may be selectively chosen based on utility of the applications. The critical files are always included in the hoard.

A file selector 247 is coupled to the utility calculator 246 and is configured to select the content set based on utility value for each of the content/files in the content set at the time of the scheduled hoarding given the constraints. The constraints amongst other, include the available hoard capacity, available battery lifetime, available bandwidth, the signal strength, remaining time before which the client disconnects, planned disconnection period and the like. A scheduling algorithm running in the file selector 247 selects the actual content set that is required to be hoarded on the client 210.

Once the content set is computed the client 210 the schedule for hoarding the content set on the client 210 is also computed. The communication between the client 210 and the server 220 is typically accomplished using for example a push-pull mechanism.

Figure 2B:
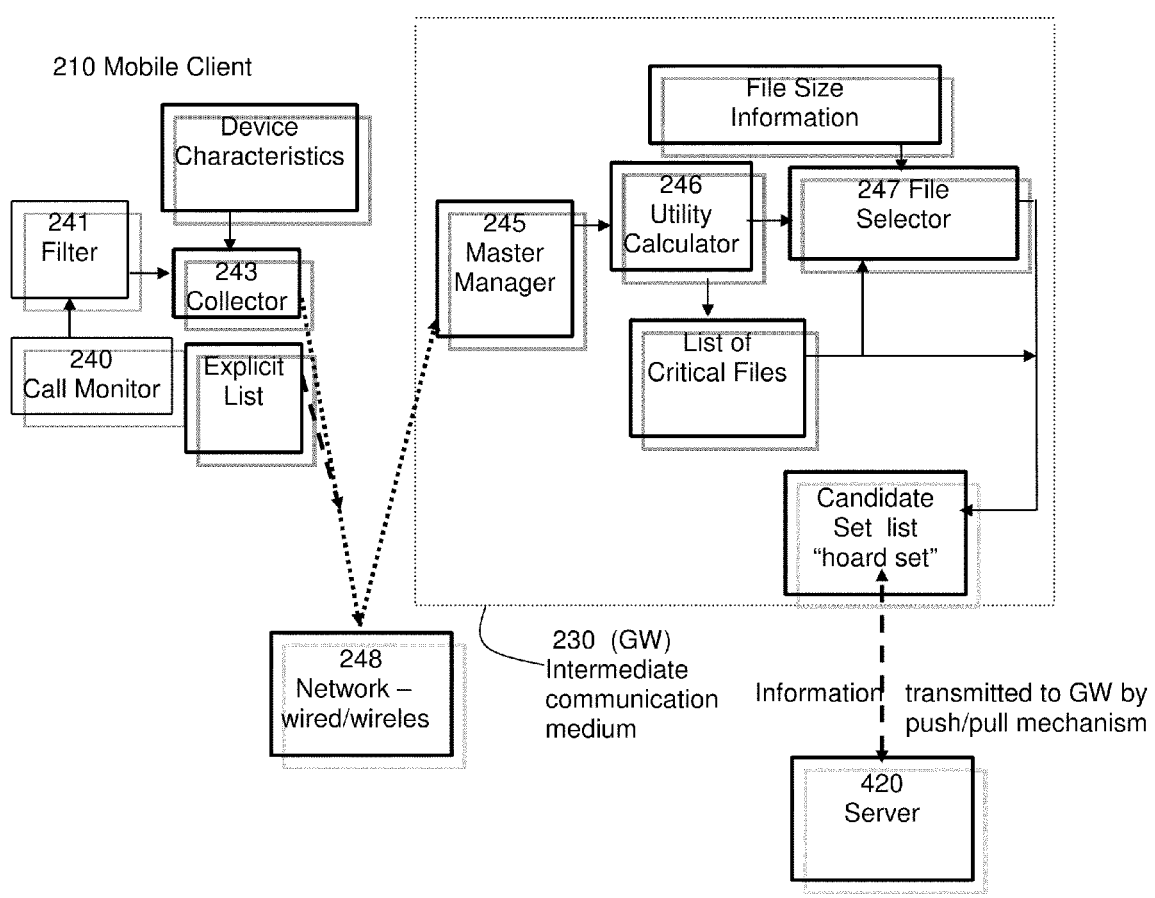
FIG. 2B illustrates an exemplary embodiment of hoarding workflow for a receiving entity and a servicing entity involving a gateway as a preferred embodiment

In a further embodiment FIG. 2B illustrates an exemplary embodiment of a typical workflow 201 for the hoarding the content set on the client 210. The client 210 couples to a respective server 230 via gateway 230 and allows seamless access of to the clients 210 over a network to the content set.

In FIG. 2B, the call monitor 240, the call filter 241 and the collector 243 form part of the mobile client 210. The functioning of each of these components has been described previously with respect to FIG. 2A. The master manager 245, utility calculator 246 and the file selector 247 form part of the gateway 230. The functioning of these components has also been described previously in FIG. 2A. It should be apparent to a person skilled in the art that in clients 210 with limited memory and processing power, the computation of the content set is performed on the gateway 230.

In a further embodiment, the client 210 may compute the hoard set and transmit the same to the gateway 230. Based on the hoard set, the gateway 230 is configured to compute a schedule to hoard the files on the client 210 based on the various constraints such as includes the available hoard capacity, available battery lifetime, available bandwidth, the signal strength, remaining time before which the client disconnects, planned disconnection period and the like. The gateway 230 can pre-fetch the files required to be hoarded on the client 210 and store the files on the local cache of the gateway 230. At the scheduled time the gateway 230 can initiate transferring of the files to the client 210, by a push mechanism such that the content set is hoarded on the client prior to disconnection.

The Hoarding Model and Algorithm

File access patterns can be used to determine the utility of a file which is an indication of the usefulness of the file to the user for hoarding purposes. The hoarding utility of content/files also indicates the probability of the content/files being accessed at a future time. The utility of the file can for example be calculated from frequency of access, recency of access, duration of access and regularity of access Future probability of the file access depends on the access history due to the local properties of the content/file, properties of the device etc. The file access time represents the temporal file access behavior of the user and is exploited for file access prediction. Least recently and frequently used (LRFU) is a cache replacement algorithm that combines the most popular cache replacement policies of least recently used (LRU) and least frequently used (LFU) in order to improve the systematic performance of hoarding. In LRFU, equal weights are given to the most recent history as well as past accesses of the files. However, a users long term access patterns of files is subject to change often, the invention provides a scheme that gives more priority to recent behavior over past and accommodates for more adaptive changes in access patterns. The invention describes a modified LRFU algorithm wherein the utility value based on access history at time H(t) can be calculated using:

$$H(t) = \frac{1}{2^{\lambda_r(t-t_Q)}} + \sum_{i=1}^{Q-1} \frac{1}{2^{\lambda_o(t-t_r)}} \tag{1}$$

$$= H_r(t) + H_o(t), \ 0 \le \lambda_0 \le 1, \ 0 \le \lambda \le 1, \tag{2}$$

where 'Q' represents the total number of accesses before time 't' and '$t_i$' represents the time of the $i^{th}$ access of the same file, and $I=1, \ldots, Q$. The controllable parameters, $\lambda_r$ and $\lambda_o$, determine the weights given to the recent history and old history. $H_r(t)$ and $H_o(t)$ denote the contributions by the most recent access and the older accesses, respectively. The most recent access $H_r(t)$ is isolated from other older accesses, $H_o(t)$, as the recent access information provides the short term behavior of the user whereas the older accesses indicate the long term behavior. Notably, when $\lambda_r = \lambda_o$, the method of the present invention is equivalent to the method of the LRFU model.

H(t) can be computed from the utility value at the previous hoard event and the file references made immediately after that hoard instant. Assuming that the last hoarding time is $t_h$, the current utilities can be computed using:

$$H_r(t) = \begin{cases} \frac{1}{2^{\lambda_r(t-t_h)}} H_r(t_h), & \text{if } t_n < t_h, \\ \frac{1}{2^{\lambda_r(t-t_n)}}, & \text{otherwise.} \end{cases} \quad (3)$$

and:

$$H_o(t) = \frac{1}{2^{\lambda_o(t-t_h)}} H_o(t_h) + \sum_{i=1}^{n-1} \frac{1}{2^{\lambda_o(t-t_i)}}, \quad (4)$$

wherein 'n' represents the number of accesses made after the last hoarding time.

The duration of activity for the file is the time period between an "open" reference and the corresponding "close" reference by the same hoarding process. Files with longer durations of activity have a higher probability of being accessed and hence have higher utility values for hoarding. Notably, when multiple processes are involved, these processes can open a single file concurrently and can perform various accesses in parallel. However, durations of activity created by all the hoarding processes are added between two consecutive hoarding times. The utility value based on activity for the file is computed for each file using the last utility value and the current sum of durations of activities created by all the hoarding processes. The utility value based on an activity at time 't' is computed by:

$$A(t) = \beta A(t_h) + (1-\beta)\Delta(t_h, t), \quad (5)$$

where $$\Delta(t_h, t) = \frac{1 - \exp\left(-\gamma \sum_{i=1}^{k} d_i\right)}{1 - \exp(-\gamma(t-t_h))}, \quad 0 \leq \beta \leq 1, \quad (6)$$

where $d_i$ represents the duration of $i^{th}$ activity, $i=1, \ldots, k$, and k is the total number of active periods between the last hoarding event and current hoarding event. The parameter $\beta$ controls the weight for the history as time progresses. The denominator in the function $\Delta(t_h,t)$ is used for normalization.

Regularity of file references has an important role in capturing the long term behavior of the user. Regularity of access of files depends on how "regularly" the file is being accessed by some process and may reflect the user's day-to-day behavior with the system. For example, a typical user checks his scheduler daily creates events and updates intermittently on the scheduler. Although, these files are accessed infrequently, these are important for the hoarding process as these files have a higher chance of reference within a specific time period. Assuming regularity based on daily reference, a day can be divided into several time segments. The utility value based on regularity at $r^{th}$ segment on $m^{th}$ day is computed as $C(r,m) = \delta C(r, m-1) + (1-\delta)\Delta_c(r,m)$, $0 \leq \delta \leq 1$, wherein $\Delta_c(r, m) = 1$ if the file is accessed at least once in the $r^{th}$ time segment within the day, and $\Delta_c(r,m) = 0$ if there is no access during the same segment. The controllable parameter $\Delta$ determines the weights given to the current regularity measure and the old regularity measures.

Based on these three factors of frequency/recency, duration of activity and regularity of access, the utility value of a file at time 't' is computed using the equation:

$$U(t) = w_1 H(t) + w_2 A(t) + w_3 C(r,m), \quad (7)$$

where $w_1$, $w_2$ and $w_3$ are the corresponding weights given to frequency/recency, duration of activity and regularity of access. The utility function U(t) can be calculated based on previous utility components at the last hoarding time $t_h$ and the subsequent file accesses.

The hoard set selection problem is to find an optimal set of files that fits into the available capacity C of the cache size, while maximizing the total utility of the selected files. Let $U_j(t)$ denote the hoarding utility of the $j^{th}$ file at hoarding time t, where $j=1, \ldots, N$, and N denotes the total number of files in the system. Let $\alpha_j$ be the indicator variable such that $\alpha_j=1$ if the file j is selected for hoarding, else $\alpha_j=0$. The automated hoarding problem can be formulated as an optimization problem subject to the constraint of available cache size. The problem is to choose the set of $\alpha_j$ so as to maximize the total hoarding utility $\Sigma_{j=1}^{N} \alpha_j U_j(t)$, subject to the size constraints, i.e., $\Sigma_{j=1}^{N} \alpha_j U_j(t)$, should not exceed the available cache capacity C. If $S_j(t)$ denote the actual size of the $j^{th}$ file, the optimized objective function is:

$$\max \sum_{j=1}^{N} \alpha_j U_j(t), \quad (8)$$

subject to the condition that:

$$\sum_{j=1}^{N} \alpha_j S_j(t) \leq C, \quad (9)$$

$$\alpha_j \in \{0, 1\}, \text{ for all } j. \quad (10)$$

where the objective function and the constraints are linear functions of the variables $\alpha_j$ and all variables are restricted to take binary values referred to as an integer linear program or ILP, more specially, a binary integer linear programming or BIP.

Relaxing the constraint in Eq. (10), where $\alpha_j$ can take linear values this reduces to an linear program (LP) which can be solved using standard mathematical toolkits as apparent to a person skilled in the art. However, the values of $\alpha_j$ returned are fractional. In order to obtain integral values of $\alpha_j$, a rounding off approach is used wherein the $\alpha_j$ returned by the LP solution are sorted in descending order. Each $\alpha_j=1$ is then rounded off to 1 if Eq. (9) is not violated, else set $\alpha_j=0$ and continue till all the $\alpha_j$ are exhausted.

In a further embodiment, another algorithm for sorting $U_j(t)/S_j(t)$ may also be used to solve the above mentioned problem. In this technique, the files are sorted according to decreasing order of $U_j(t)/S_j(t)$ and selected one after another from the beginning of the list until Eq. (9) is violated. In this case preferences for files that have higher utility per unit size are chosen.

Hoarding Content

Once a candidate content set is chosen the client 210 needs to obtain the relevant files contained in the content set from server 230. This process of file transfer from the server 230 can happen as a background task either periodically or when disconnection is anticipated for example based on a known deadline. In case of periodic hoarding, the decision to hoard is dependent on the change in the user's working set, device characteristics and network characteristics. A change in the user's working set is captured by the difference between currently hoarded files on the device and predicted hoard set. When the users working set does not change drastically, the process of hoarding can be postponed until there is significant change in the working set. Any change in current device and network characteristics is captured by the difference for example in available battery power and network bandwidth and the like. In case of good network connectivity or ample battery power, the hoarding can be done in a proactive manner. On the other hand, it may happen that the disconnection happens soon after the device moved to a weakly connected state. In this case the mobile device can anticipate an imminent disconnection, either from signal strength indications or from TCP timeouts, packet retransmissions and the like, and the system i.e., the client-server and/or the gateway can then decide to schedule a hoard transfer such that most important files are transferred apriori, and in a method that the entire content set is transferred from the server to the client.

Figure 3:
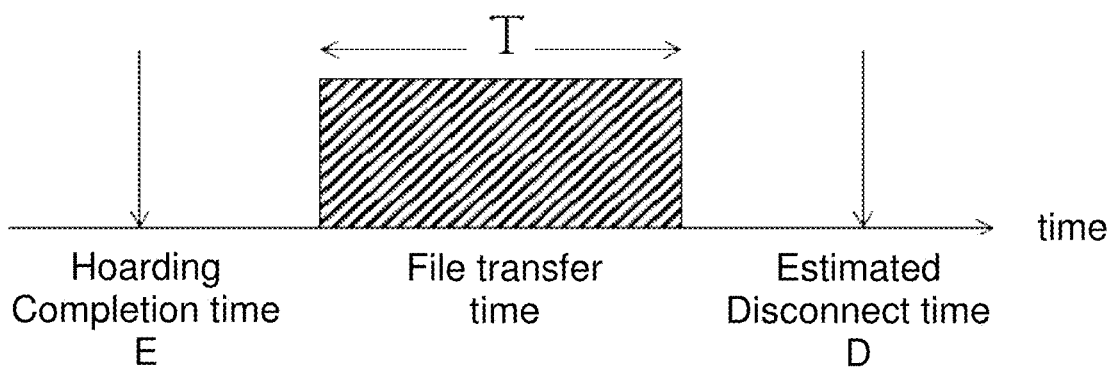
FIG. 3 illustrates an exemplary embodiment of a flow of transferring files based on a disconnection deadline.

In case of deadline based hoarding where the client knows the estimated time of disconnection, the selected hoard set should be transferred before the client disconnects. If the estimated disconnect time is D, hoarding process completion time is E, and estimated time to transfer the entire hoard set depending on available network bandwidth and the total size of file set is T, then for transferring all the files in the hoard set it is required that T<=D-E as shown in FIG. 3. When D is small and a large number of files have to be transmitted over a weak connection, the client might be able to transfer only a partial set. Thus there should be a scheduling policy which, depending on available network bandwidth, and the size of the candidate set to be hoarded, detects when to start the transfer of files and the order in which the transfer should happen, such that the files of greater importance are transferred ahead of the others.

Additionally, for constrained clients, such as portable handhelds\devices, power consumption for file transfer is preferred to be below a threshold P. Let $\delta_j(t)$ be the number of bytes of the $j^{th}$ file that needs to be updated at the client at time t. To transfer all files in the hoard set, the power consumed is $\Sigma_{j=1}^{N}=_L e\delta_j(t)$, where "e" is the energy consumed (joules/byte) to receive one byte of data. If the complete file needs to be updated at time t then $\delta_j(t)$ equals $S_j(t)$. Once again if P is small, then the client might have to transfer a partial list of files. Thus, given a hoard deadline D and a hoard energy threshold P, the transfer scheduling is to decide on an ordering of file transfer such that the maximum utility files are transferred before the deadline expires and/or the energy threshold is overrun. File transfer continues until either one or both constraints of D and P are violated. This is a policy based scheduling algorithms for a hoarding schedule computation in order to prioritize the files to be fetched. The policy base schedule performs the following tasks:

selecting files in decreasing order of utility or increasing order of size;

group the sorted list of files according to type and select based on the file types;

select files that have observed to cause a hard-miss. Lower priority of files that cause soft-miss such that they will be chosen only when all other files are hoarded; and prompt user to prioritize files etc.

Computer Hardware Overwiew

Figure 4:
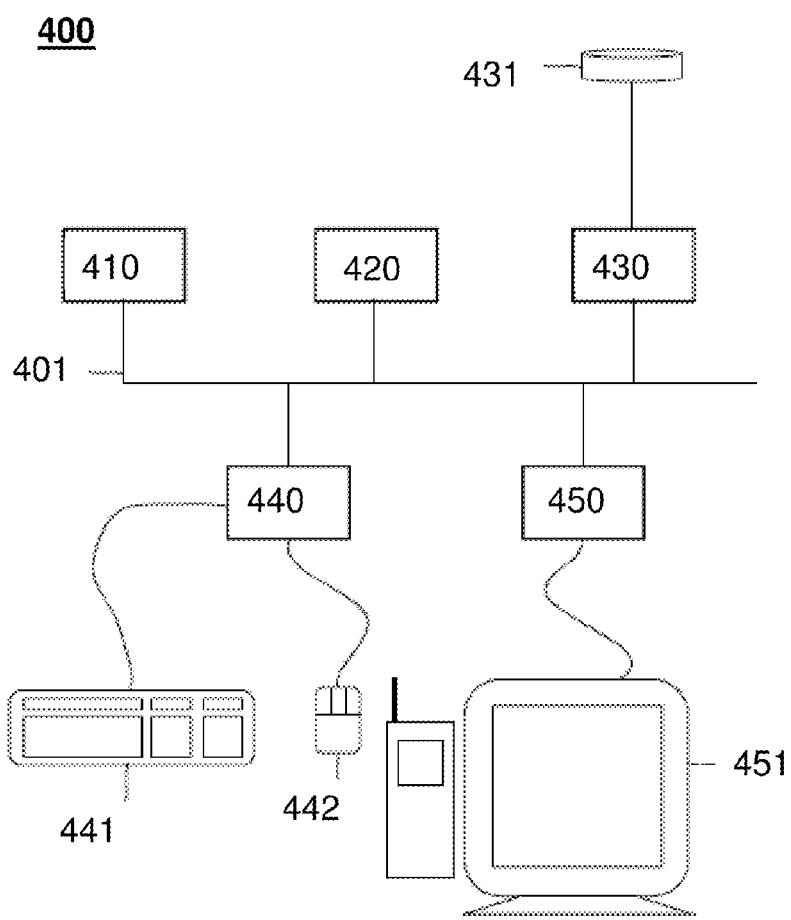
FIG. 4 illustrates an exemplary embodiment of a computer system suitable for use with the method of FIGS. 2A and 2B and in the architecture of FIG. 1.

FIG. 4 schematically shows an embodiment of the system 400, wherein the system 400 can comprise a client, a server or a gateway. It should be understood that FIG. 4 is only intended to depict the representative major components of the system 400 and that individual components may have greater complexity than that represented in FIG. 4. Several particular examples of such additional complexity or additional variations are disclosed herein; it being understood that these are by way of example only and are not necessarily the only such variations.

The system 400 comprises a system bus 401. A processor 410, a memory 420, a disk I/O adapter 430, a network interface (not shown in the Figure), a transceiver and a UI adapter 440 are operatively connected to the system bus 401. A disk storage device 431 is operatively coupled to the disk I/O adapter 430, in the case of the client this being an optional element. A keyboard 441, a mouse 442 (optional element) and a display 443 are operatively coupled to the UI adapter 440. A display device 451 is operatively coupled to the system bus 401 via a display adapter 450. The terminal/display interface 450 is used to directly connect one or more display units 451 to the computer system 400.

The system 400 is configured to implement the hoarding process via a signal embodied in a carrier ware is stored on a tangible computer readable medium such as a disk storage device 431 or the memory of the client and/or gateway. The client stores and runs the program whereas the server stores content that needs to be fetched and hoarded on the client. The system 400 is configured to load the program into memory 420 and execute the program on the processor 410, on the client, the server and/or the gateway. The user inputs information to the system 400 using the keyboard 441 and/or the mouse 442. The system 400 outputs information to the display device 451 coupled via the display adapter 450. The skilled person will understand that there are numerous other embodiments of the workstation known in the art and that the present embodiment serves the purpose of illustrating the invention and must not be interpreted as limiting the invention to this particular embodiment.

The disk I/O adapter 430 coupled to the disk storage device 431, in turn, coupled to the system bus 401 and the disk storage devices represents one or more mass storage devices, such as a direct access storage device or a readable/writable optical disk drive. The disk I/O adapter 430 supports the attachment of one or more mass storage devices 431, which are typically rotating magnetic disk drive storage devices, although there could alternatively be other devices, including arrays of disk drives configured to appear as a single large storage device to a host and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), high density DVD (HDDVD), holography storage systems, blue laser disks, IBM Millipede devices and the like.

The network interfaces and the transceiver allow the system 400 to communicate with other computing systems 400 over a communications medium, preferably over a network.

The network may be any suitable network or combination of networks and may support any appropriate protocol suitable for communication of data and/or code to/from multiple computing systems 400. Accordingly, the network interfaces can be any device that facilitates such communication, regardless of whether the network connection is made using present day analog and/or digital techniques or via some networking mechanism of the future. Suitable communication media include, but are not limited to, networks implemented using one or more of the IEEE (Institute of Electrical and Electronics Engineers) 802.3x "Ethernet" specification; cellular transmission networks; and wireless networks implemented one of the IEEE 802.11x, IEEE 802.16, General Packet Radio Service ("GPRS"), FRS (Family Radio Service), or Bluetooth specifications. Those skilled in the art will appreciate that many different network and transport protocols can be used to implement the communication medium. The Transmission Control Protocol/Internet Protocol ("TCP/IP") suite contains suitable network and transport protocols.

The system 400 is a general-purpose computing device. Accordingly, the CPUs 410 may be any device capable of executing program instructions stored in the main memory 420 and/or a supplementary memory (not shown in the figure) and may themselves be constructed from one or more microprocessors and/or integrated circuits. The main memory unit 420 in this embodiment also comprises an operating system, a plurality of application programs (such as the program installation manager), and some program data. The system 400 contains multiple processors and/or processing cores, as is typical of larger, more capable computer systems.

The computing system 400 of FIG. 4 can have multiple attached terminals 451, such as might be typical of a multi-user "mainframe" computer system. In such a case, the actual number of attached devices is typically greater than those shown in FIG. 4, although the present invention is not limited to systems of any particular size. The computing systems 400 may alternatively be a single-user system, typically containing only a single user display and keyboard input, or might be a server or similar device which has little or no direct user interface, but receives requests from other computer systems (clients). In other embodiments, the computing systems 400 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The embodiments described with reference to FIGS. 1-4 generally use client-server network architecture. However, those skilled in the art will appreciate that other network architectures are within the scope of the present invention. Examples of other suitable network architectures include peer-to-peer architectures, grid architectures, and multi-tier architectures. Accordingly, the terms web server and client computer should not be construed to limit the invention to client-server network architectures.

The various software components illustrated in FIGS. 1-4 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system, and that, when read and executed by one or more processors in the computer system, cause the computer system to perform the steps necessary to execute steps or elements comprising the various aspects of an embodiment of the invention. The various software components may also be located on different systems than depicted in FIGS. 1-4.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Therefore, it is desired that the embodiments described herein be considered in all respects as illustrative, not restrictive, and that reference be made to the appended claims for determining the scope of the invention.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A computer-implemented method for hoarding content on a requesting mobile electronic computing entity comprising:

computing, by a computing device, power parameters on said requesting mobile electronic computing entity, said power parameters comprising:

available power on said requesting mobile electronic computing device; and energy consumption required to hoard files onto a local cache on said requesting mobile electronic computing device;

computing, by said computing device, communication parameters on said requesting mobile electronic computing entity, said communication parameters comprising:

available network bandwidth;
received and transmitted signal strength; and
signal strength of a communication network;
computing, by said computing device, a hoarding schedule for a content set at the requesting mobile electronic computing entity based on said computed power parameters and said communication parameters;
managing, by said computing device, power consumption and network bandwidth during a hoarding process based on said computed hoarding schedule;
receiving the content set at the requesting mobile electronic computing entity based on said computed hoarding schedule; and
hoarding, by said computing device, the received content set on said local cache of the requesting mobile electronic computing entity.

2. The method of claim 1, further comprising:
computing, by said computing device, the content set to be hoarded at the requesting entity;
computing, by said computing device, a utility value for each of the entities in the content set; and
prioritizing, by said computing device, each of the entities in the content set in an order of importance based on the utility value.

3. The method to claim 2, further comprising:
transmitting, by said computing device, a request comprising the content set from the requesting entity to a respective servicing entity at the computed hoarding schedule.

4. The method of claim 2, further comprising:
transmitting, by said computing device, a request from the requesting entity to a respective intermediate communication medium.

5. The method of claim 4, wherein the request comprise the content set and the computed hoarding schedule.

6. The method of claim 4, wherein the request comprises the content set.

7. The method of claim 6, wherein the intermediated communicating medium is configured to compute said hoarding schedule for the content set.

8. The method of claim 7, wherein the intermediated communicating medium is configured to compute the content set and a respective hoarding schedule for the content set.

9. The method of claim 1, wherein the content set comprises entities and respective attributes associated with each of the entities.

10. The method of claim 4, wherein the intermediate communication medium is configured to perform in addition the function of a server.

11. The method of claim 4, further comprising:
pre-fetching, by said computing device, the respective content set from the servicing entity; and
caching, by said computing device, the content set on the intermediate communications medium.

12. The method of claim 11, further comprising:
initiating, by said computing device, a push mechanism on the intermediate communication medium to push the content set to the requesting entity at the computed hoarding schedule.

13. The method of claim 3, further comprising:
updating, by said computing device, the intermediate communication medium by transmitting the request from the requesting entity to the intermediate communication medium at periodic intervals.

14. A mobile electronic computing device comprising:
at least a processor unit;
a memory unit storing executable instructions that, when executed by said at least one processor unit, cause said at least one processor unit to perform:
computing, by a computing device, power parameters on said requesting mobile electronic computing entity, said power parameters comprising:
available power on said requesting mobile electronic computing device; and
energy consumption required to hoard files onto a local cache on said requesting mobile electronic computing device;
computing, by said computing device, communication parameters on said requesting mobile electronic computing entity, said communication parameters comprising:
available network bandwidth;
received and transmitted signal strength; and
signal strength of a communication network;
computing, by said computing device, a hoarding schedule for a content set at the requesting mobile electronic computing entity based on said computed power parameters and said communication parameters;
managing, by said computing device, power consumption and network bandwidth during a hoarding process based on said computed hoarding schedule;
receiving the content set at the requesting mobile electronic computing entity based on said computed hoarding schedule; and
hoarding, by said computing device, the received content set on said local cache of the requesting mobile electronic computing entity;
an input output interface; and
a transceiver and configured to compute said content set and said respective hoarding schedule for the content set.

15. The electronic computing device of claim 14, wherein a utility calculator configured to compute a utility value for each entity in the content set.

16. The electronic computing device of claim 14, wherein the utility calculator is coupled to a file selector, the file selector configured to distinguish between the critical entities and prioritizing entities forming the content set.

17. The electronic computing device of claim 14, wherein a master manager is configured to maintain a master table comprising access history of the entities forming the content set.

18. The electronic computing device of claim 14, configured to receive the content set and hoard the received content set on a readable medium at the computed hoarding schedule.

19. The electronic computing device of claim 14, wherein an intermediate communication medium interfaced with the electronic computing device, the intermediated communication medium configured to compute the content set and the respective hoarding schedule.

20. The electronic computing device of claim 19, wherein the intermediate communication medium is configured to push the content set to the electronic computing device at the computed hoarding schedule.

* * * * *